Oct. 6, 1953
C. F. JONES
2,654,276
KNURLING DEVICE
Filed Sept. 27, 1949
2 Sheets-Sheet 2
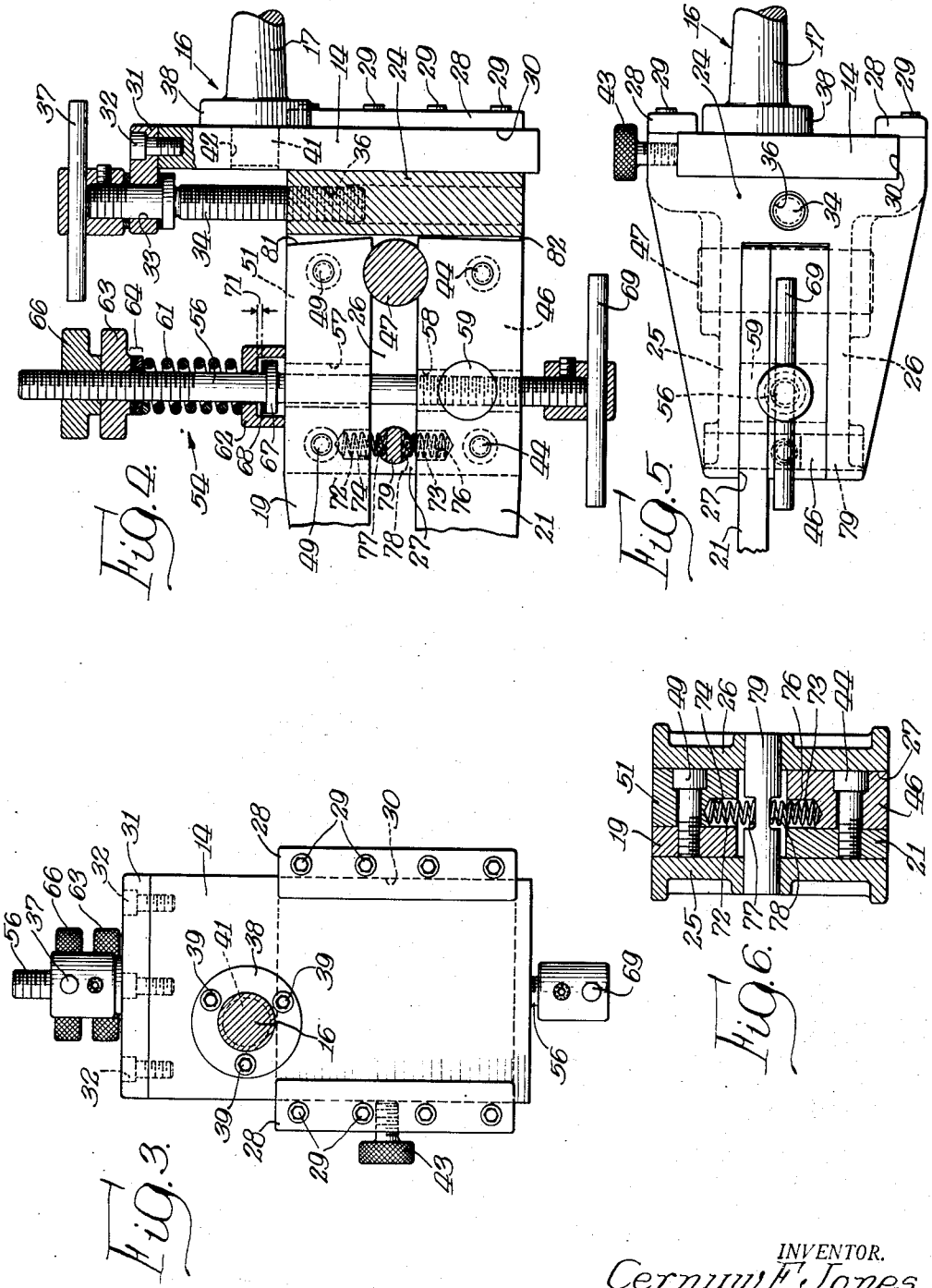
INVENTOR.
Cerny W. F. Jones,
BY
Davis, Lindsey, Hibben & Noyes
Attys.

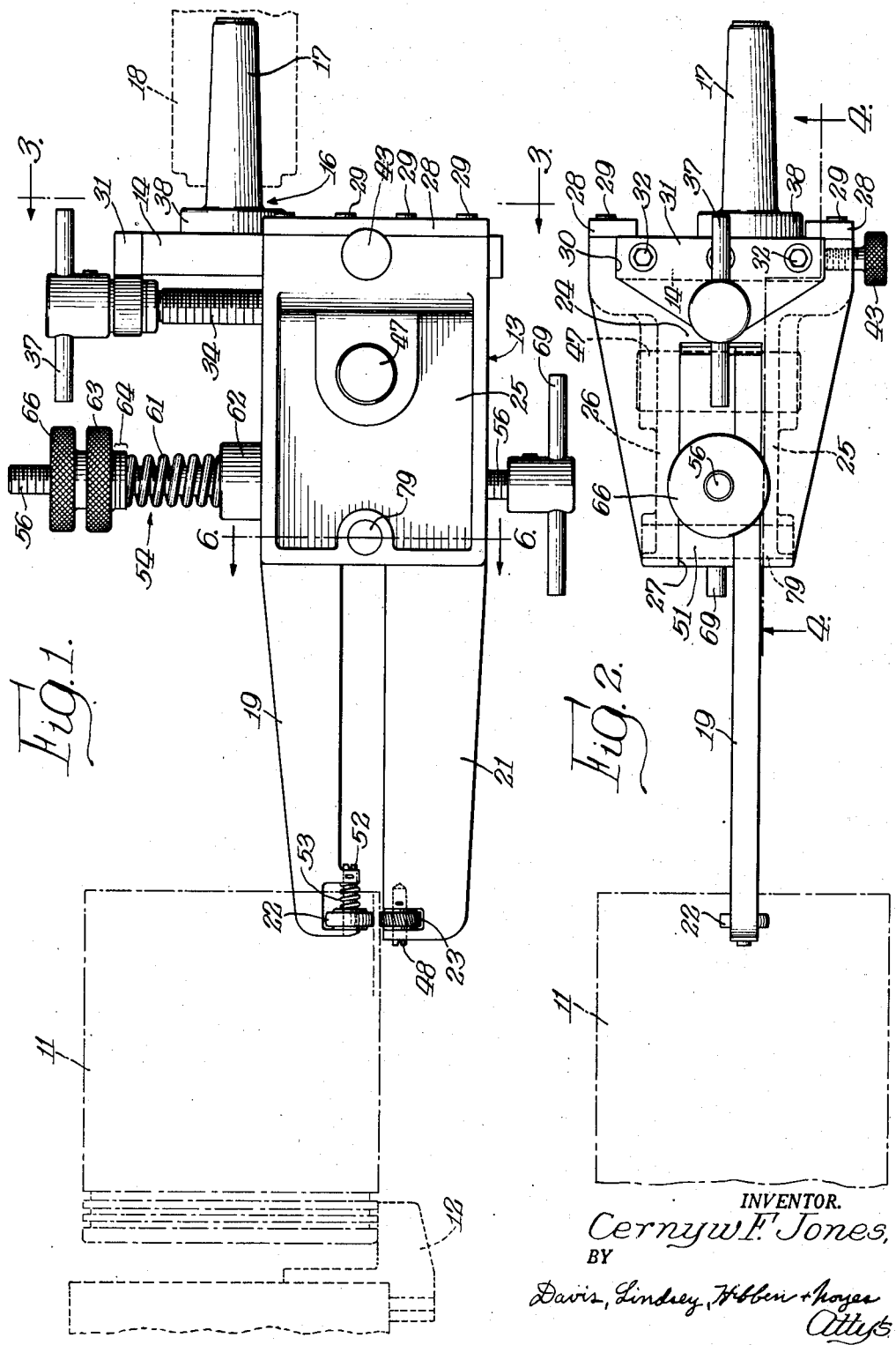

Patented Oct. 6, 1953

2,654,276

UNITED STATES PATENT OFFICE 2,654,276

KNURLING DEVICE

Cernyw F. Jones, Economy, Ind., assignor to Perfect Circle Corporation, Hagerstown, Ind., a corporation of Indiana Application September 27, 1949, Serial No. 117,961

6 Claims. (Cl. 80—5.1)

This invention relates generally to a knurling device for knurling the peripheral surface of a cylindrical object and more particularly to a device for knurling predetermined areas on the peripheral surface of a hollow cylindrical article such as a piston for an internal combustion engine.

With continued operation of an internal combustion engine, the pistons and cylinders tend to wear or become distorted with the result that the normal fit of the pistons within the cylinders is lost. This condition is often characterized by "piston slap" and other evidence of excessive looseness. The lack of proper fit between the piston and the cylinder is objectional since it impairs engine efficiency and has an adverse effect on the economy of operation.

Various means for correcting this condition have been employed, one method involving the expansion of the outer wall or skirt portion of the piston sufficiently to reestablish the normal fit between piston and cylinder. Such expansion may be accomplished, for example, by knurling the outer surface of the piston to form roughened areas on the thrust faces thereof having an interrupted surface comprising projecting portions with intervening depressions. During knurling, the metal is extruded or swaged to a sufficient extent so that the projections formed on the piston surface extend outwardly to the desired increased size whereby the proper fit between the piston and the cylinder is realized.

In order to insure accuracy during knurling of a piston, it is desirable to mount the piston securely for rotation about a fixed axis while at the same time employing a knurling tool or mechanism which can be properly held during knurling but is also adjustable relative to the fixed axis of rotation of the piston in order to accommodate pistons of varying diameter. Inasmuch as the usual automobile repair shop is provided with a lathe for accurate machine tool work and the like, it is both desirable and convenient to secure the piston in the chuck at the head stock of a lathe with the knurling device being mounted on the tail stock of the lathe. Because the normal contour of a piston is slightly oval or out-of-round and the piston is rigidly retained against lateral movement by the lathe chuck jaws, it is necessary that such a knurling device be designed to compensate for the varying diameter of the piston as the latter rotates about a fixed axis with the chuck. In addition, the knurling mechanism preferably comprises an anvil member or other supporting means adapted to engage and support the piston internally while a knurling element engages the exterior of the piston under pressure. However, the interior surface of the skirt portion of a piston is usually quite uneven in the area between the wrist pin bosses because of various protuberances and surface irregularities such as reinforcing ribs, partial machining of the interior surface, and general surface roughness characteristic of cast articles. Thus, the additional problem is presented of providing a knurling device which will readily accommodate the variations in piston wall thickness while at the same time avoiding any substantial change in knurling pressure against the outer surface of the piston.

Accordingly, one object of my invention is to provide a novel device for knurling the exterior surfaces of pistons which is adapted for use with a lathe and which is simple, rapid, and accurate in operation.

A further object of the invention is to provide a novel device of the foregoing character which is adapted for use with a lathe and which may be readily adjusted to knurl pistons of varying diameter.

An additional object of my invention is to provide a novel device for knurling the exterior surfaces of pistons which readily accommodates variations in piston wall thickness while maintaining a substantially constant knurling pressure.

Another object of my invention is to provide a novel device for knurling the exterior surfaces of pistons in which a supporting member engages the interior of the piston, a knurling member engages the exterior of the piston, and the spacing between said members is permitted to vary automatically to accommodate protuberances and other irregularities on the interior surface of the piston.

Still another object of the invention is to provide a novel device for knurling the exterior surface of a piston which is adapted for use with a lathe and which is also adapted to accommodate slight variations in piston diameter due to the normal out-of-round contour of the piston.

Other objects and advantages of the invention will become apparent from the subsequent detailed description of the invention and the accompanying drawings, in which:

Fig. 1 is a front elevational view of a knurling device comprising one specific embodiment of my invention as mounted for operation on a lathe, portions of the lathe being shown fragmentarily in dotted lines;

Fig. 2 is a top plan view of the device shown in Fig. 1;

Fig. 3 is an end view of the device taken along the line 3—3 of Fig. 1;

Fig. 4 is a fragmentary vertical sectional view taken substantially along the line 4—4 of Fig. 2;

Fig. 5 is a fragmentary bottom plan view of the device; and

Fig. 6 is a vertical sectional view taken along the line 6—6 of Fig. 1.

The knurling device comprising the present invention is provided with a pair of cooperating anvil and knurling elements, the anvil element being arranged to engage the piston internally while the knurling element bears against the outer surface of the piston. The knurling element is preferably in the form of a small roller which is applied to the outer surface of the piston in rolling relation therewith so that the resultant area knurled in one application of the tool comprises a band having a width equal to the width of the roller. Usually the roller is relatively narrow and traverses the piston circumferentially so that a plurality of such knurled bands are required to cover a desired area longitudinally of the piston. The knurled bands may, of course, be disposed in continuous abutting relation to one another or they may be slightly spaced from each other longitudinally of the piston.

With a piston for an internal combustion engine, it is necessary to knurl only the thrust faces of the piston skirt, i. e. those portions which are subjected to lateral thrust against the cylinder wall due to the position of the connecting rod. Thus, the knurling operation may be restricted to the portions of the piston skirt lying intermediate the wrist-pin holes on opposite sides of the piston. The knurled area preferably starts immediately below the ring grooves at the upper end of the piston and may extend axially or longitudinally for the full length of the piston skirt. If desired, the knurled band at the extreme outer end of the skirt may be spaced differently from the remaining bands in order to position the outermost band as close as possible to the lower edge of the piston.

In addition to effecting expansion of the piston metal by extrusion thereof, in the manner hereinbefore described, whereby to reestablish a proper fit between the piston and the cylinder, the knurled surface obtained by my invention also offers other important advantages. For example, it has been found that better performance is obtained in a reciprocating piston and cylinder, or other like construction, if one of the two surfaces is of an interrupted nature comprising projecting portions with intervening depressions, such as may be provided by knurling. A surface of this character has been found to run cooler than an absolutely smooth surface for pistons as well as other cylindrical objects adapted to reciprocate within a bore. Another advantage inherent in knurling the surfaces of pistons and like articles is found in the improved wearing qualities of the knurled surface resulting from the hardening effects of cold working the metal Moreover, the interrupted surface afforded by knurling provides a series of pockets or reservoirs which serve to retain lubricating oil and thereby maintain a continuous supply of lubricant at the surface-contacting areas.

It will be apparent that, in addition to the obvious utility of knurling old or worn pistons in order to expand the same, knurling may also be resorted to in the case of new pistons or original assemblies of pistons within their cylinders in order to attain the other advantages mentioned above. While the knurling device comprising the present invention is designed primarily for knurling pistons, the invention is not limited in this manner but embraces the knurling of the peripheral surfaces of hollow cylindrical articles generally.

The term "knurling" as used throughout the specification and the claims is not limited to the ordinary form of knurling involving grooves arranged in a criss-cross pattern, but rather is used in a broad sense to include any surface formation involving alternate depressed and raised portions regardless of whether one or the other or both of said portions are continuous throughout the area having such formation. Thus, the term includes not only the criss-cross pattern but also a pattern formed by parallel grooves or by isolated indentations resulting in connected raised portions.

As hereinbefore mentioned, an important object of my invention is to provide a knurling device for pistons which is designed to accomodate varying piston wall thicknesses due to internal protuberances or surface irregularities while at the same time avoiding substantial changes in knurling pressure and eliminating the need for manually adjusting or regulating the device during a knurling operation. I accomplish this end broadly by providing a pair of cooperating anvil and knurling members which are operatively connected for pivotal movement toward and away from each other, in combination with a spring means for yieldingly urging the anvil and knurling members toward each other. The yieldable urging of the members toward each other permits a variation in spacing between the members upon contact of the anvil member with protuberances on the interior surface of the piston skirt while the knurling member bears with substantially constant pressure against the exterior surface of the skirt.

Referring now to the drawings, Fig. 1 illustrates the general arrangement of my knurling device as supported on a lathe for knurling a piston. The piston, indicated in broken lines at 11, is secured for rotation about a fixed axis by the jaws of the lathe chuck, indicated in dotted lines at 12. The knurling mechanism proper is supported by a carriage 13 movably mounted on a slide 14 in the form of a rectangular plate, the carriage 13 being adjustable thereon, by means hereinafter described in detail, for accommodating pistons of different diameters. Rigidly affixed to the slide 14 is an attaching member 16 having an outwardly extending tapered shank 17 adapted to be received in the tail stock of the lathe, as indicated in dotted lines at 18. The knurling mechanism, described hereinafter in detail, comprises a pair of elongated arms 19 and 21 having an anvil element 22 and a knurling element 23 rotatably supported adjacent the outer ends thereof. During operation of the device the anvil element 22 engages the interior surface of the skirt portion of the piston 11 while the knurling element 23 traverses the exterior surface of the piston skirt as the piston 11 is rotated about its axis by the lathe chuck.

Referring now to Figs. 1 to 6, inclusive, the structural details of the knurling device and its mode of operation will be described. The body or carriage 13 of the knurling device is formed with an end wall 24 and a pair of oppositely disposed side walls 25 and 26 extending beyond the end wall 24 and providing a slot 27 at the opposite end of the carriage 13. A pair of retaining strips 28 are secured to the extended outer ends of the side walls 25 and 26, as by a plurality of screws 29 (Fig. 3), and project inwardly from the side walls for retaining the slide 14 in a slideway or recess 30 defined between the extended outer ends of the side walls and having the slide 14 slidably received therein.

For adjusting the carriage 13 along the slide 14, a supporting bracket 31 extends inwardly from the top of the slide 14 and is secured thereto by a plurality of screws 32. Journaled in the bracket 31, as seen at 33 in Fig. 4, is an elongated adjusting screw 34 depending from the bracket 31 and threaded in a cooperating bore 36 provided in the end wall 24 of the carriage 13. An operating handle 37 is mounted adjacent the upper end of the screw 34 for rotation of the latter. The attaching member 16 comprises an annular flange 38 integral with the tapered shank 17 and rigidly secured to the outer face of the slide 14 by means of a plurality of screws 39 (Fig. 3). An integral shaft or stub 41 (Fig. 4) extends inwardly from the flange 38 on the opposite side thereof and is received in a complementary aperture 42 in the slide 14.

Inasmuch as the slide 14 is rigidly held in fixed position by means of the tapered shank 17 which is received within the lathe tail stock 18, it will be seen that the vertical position or elevation of the carriage 13 (as viewed in Fig. 1) can be adjusted by manipulation of the handle 37 on the adjusting screw 34 whereby the carriage 13 may be slid upwardly or downwardly along the slide 14. Thus, the knurling mechanism may be positioned relative to the fixed axis of the lathe to accommodate pistons of varying diameter. A binder screw 43 extends inwardly through the projecting outer end of the side wall 25 to engage the adjacent edge of the slide 14 whereby to lock the carriage 13 in any desired adjusted position on the slide 14.

The arms 19 and 21 carrying the anvil and knurling elements 22 and 23, respectively, are supported within the carriage 13 for pivotal movement about a common axis and project outwardly through the slot 27 toward the head stock of the lathe. As will be described hereinafter in detail, the arms 19 and 21 are so arranged that they can pivot together about the common axis for accommodating the normal out-of-round contour of the piston, and in addition the arm 19 carrying the anvil element 22 can pivot about the same axis relative to the arm 21 for accommodating variations in piston skirt thickness.

The knurl-supporting arm 21 extends into the slot 27 of the carriage 13 and is secured by means of a pair of screws 44 (Figs. 4 and 6) to a block 46 which is pivotally supported at one edge on a shaft or fulcrum pin 47 journaled at its ends in the side walls 25 and 26. The knurling element 23 in the form of a knurling roller is rotatably mounted on a pin 48 at the outer end of the arm 21 for engaging the outer periphery of the skirt portion of the piston 11. The anvil-supporting arm 19 also extends into the slot 27 of the carriage 13, generally parallel to the knurl-supporting arm 21, and is secured by a pair of screws 49 to a block 51 which is also pivotally supported at one edge on the shaft 47 opposite the block 46 and the arm 21. Consequently, it will be seen that the arms 19 and 21 are free to pivot in unison to accommodate the normal out-of-round contour of the piston 11.

The anvil element 22 in the form of a hard smooth-surfaced roller having substantially the same width and diameter as the roller 23 is rotatably mounted on a pin 52 extending between a pair of spaced projections adjacent the outer end of the arm 19. A coil spring 53 is carried on the pin 52 for normally retaining the anvil roller 22 in radial alignment with the knurling roller 23 but permitting limited axial displacement of the roller 22 in the event that the anvil roller encounters a peripheral rim or other protuberance sometimes found at the bottom edge of a piston skirt. A spring loading device, indicated generally at 54 and described below in greater detail, coacts with the arms 19 and 21 for yieldingly urging the rollers 22 and 23 toward each other as the arms 19 and 21 and their associated blocks 51 and 46 pivot about the shaft 47.

As seen in Fig. 4, the spring loading device 54 comprises an elongated screw 56 having terminally threaded portions and extending through an enlarged bore 57 in the block 51 and through a similar enlarged bore 58 in the block 46. The lower threaded portion of the screw 56 is threaded through a swivel in the form of a pin or shaft 59 journaled in the block 46 and the arm 21 (Fig. 5) and extending transversely of the bore 58. A helical spring 61 encircles the screw 56 and bears at one end against the outer face of a cup-like bridge or thrust member 62 which seats on the upper side of the block 51 and the arm 19 attached thereto. The spring 61 is retained at its outer end by a tension adjusting nut 63 and a thrust collar 64 comprising a plurality of thrust washers. A lock nut or jam nut 66 is also provided adjacent the nut 63 for locking the latter in place in order to maintain any desired tension setting of the spring 61.

It will be seen that by adjusting the nut 63 the tension of the spring 61 can be regulated to control the spring pressure urging the arms 19 and 21 toward each other and thereby regulating the knurling pressure, i. e. the pressure under which the skirt portion of the piston 11 is clamped between the anvil roller 22 and the knurling roller 23. An integral thrust collar 67 and a thrust washer 68 loosely disposed thereon are provided on the screw 56 and are received within the thrust member 62, the diameters of the collar 67 and the washer 68 being less than the internal diameter of the member 62. A handle 69 is secured to the lower end of the screw 56 projecting below the block 46 for effecting rotation of the screw 56 relative to the swivel 59.

The operation of the spring-loading device 54 is as follows: In the position shown in Fig. 4 the screw 56 has been screwed downwardly through its threaded connection with the swivel 59 a sufficient amount so that a slight clearance, indicated at 71, is established between the thrust washer 68 and the underside of the thrust member 62. In this position the full load of the spring 61 is thus exerted against the anvil supporting arm 19 thereby urging the anvil roller 22 and the knurling roller 23 toward each other, the piston 11 having its skirt portion clamped between the rollers 22 and 23.

To release the knurling pressure, the screw 56 is screwed upwardly as viewed in Fig. 4 by means of the handle 69. As the clearance 71 is taken up, the thrust washer 68 engages the member 62 and upon continued upward movement of the screw 56 the member 62 is lifted upwardly thereby releasing the spring load from the arm 19.

For disengaging the rollers 22 and 23 from the piston skirt, a pair of coil springs 72 and 73 (Fig. 6) are disposed in a pair of cavities 74 and 76 provided at the inner faces of the blocks 51 and 46, respectively. The inner ends of the springs 72 and 73 bear against oppositely disposed flattened portions 77 and 78 formed on a thrust member in the form of a pin 79 extending between the side walls 25 and 26 of the carriage 13. During backing-off of the screw 56, the spring 72 causes the block 51 to pivot upwardly about the fulcrum pin 47 thereby swinging the anvil-supporting arm 19 upwardly and disengaging the anvil roller 22 from the interior surface of the piston 11. The inner ends of the block 51 and the attached anvil-supporting arm 19 are slanted or sloped, as indicated at 81 in Fig. 4, in order to provide the necessary clearance to permit upward pivotal movement of the block and arm during release of the spring-loading device 54. In addition, the coil spring 73 causes the block 46 to pivot downwardly about the fulcrum pin 47 thereby swinging the knurl-supporting arm 21 downwardly and disengaging the knurling roller 23 from the exterior surface of the piston 11. As seen in Fig. 4, a slight clearance indicated at 82 exists between the end wall 24 of the carriage 13 and the adjacent ends of the block 46 and the arm 21 when the spring loading device 54 is adjusted for a knurling operation. When the spring pressure of the device 54 is released in the manner just described and the coil spring 73 returns the arm 21 to disengaged position, the clearance 82 will be taken up and the inner ends of the arm 21 and the block 46 will abut the rear wall of the carriage 13 whereby to retain the arm 21 in a substantially horizontal at-rest position, as viewed in Figs. 1 to 4.

As the arms 19 and 21 are moved to disengaged position during releasing manipulation of the spring loading device 54, the screw 56 pivots slightly to the right as viewed in Figs. 1 and 4, as the swivel 59 rotates to accommodate the angular upwardly pivoted position of the block 51 and its attached arm 19. The enlarged bore 57 in the block 51 and the bore 58 in the block 46 are of sufficient size to provide the necessary clearance required to accommodate pivotal movement of the screw 56.

During the releasing movement of the screw 56, the tension setting of the spring 61 is not materially disturbed since the spring tension is determined primarily by the relative position of the adjusting nut 63 on the screw 56. Upward movement of the screw 56 from the position shown in Fig. 4 until the clearance 71 is taken up will result in a very slight decrease in the spring tension setting equivalent to the extent of the clearance 71, but this change is of no practical consequence. Thus, it will be seen that the anvil roller 22 and the knurling roller 23 can be disengaged from the skirt portion of the piston 11 without unloading the spring 61 or otherwise materially altering the spring tension setting.

To return the spring-loading device 54 to knurling position, the handle 69 is operated in reverse fashion whereby the screw 56 is moved downwardly of the device thereby forcing the arms 19 and 21 toward each other against the respective pressures exerted by the coil springs 72 and 73. When the rollers 22 and 23 are in contact with the interior and exterior surfaces, respectively, of the skirt portion of the piston 11, the screw 56 is screwed downwardly a slight distance farther until the clearance 71 is reestablished and the full load of the spring 61 is thereby exerted between the arms 19 and 21. By this slight additional movement of the screw 56, the ridges of the knurling roller 23 are pressed into the metal of the piston skirt and the inner ends of the knurl arm 21 and its associated block 46 swing away slightly from the end wall 24 of the carriage 13 to reestablish the clearance 82. Thus, the spring 61 is returned substantially to its original tension and the full spring load is again imposed on the arms 19 and 21. Once the clearance 71 is obtained, further manipulation of the handle 69 is unnecessary since the establishment of the slightest clearance at this point permits the full spring tension as determined by the setting of the nut 63 to be applied to the device.

In knurling a piston with the device herein described, the piston 11 is first secured to the chuck jaws 12 at the head stock of the lathe with the skirt portion of the piston extending toward the knurling mechanism. With the spring-loading device 54 in released position, the tail stock 18 is moved toward the head stock of the lathe until the skirt portion of the piston 11 extends between the rollers 22 and 23 to the desired extent. By means of the handle 37 the adjusting screw 34 is then manipulated to position the carriage 13 on the slide 14 to accommodate the particular diameter of the piston being knurled. Upon adjustment of the nut 63 to obtain the desired tension of the spring 61 and upon manipulation of the spring loading device 54 to return the arms 19 and 21 to knurling position, the desired knurling operation may then be carried out by rotating the lathe chuck and the piston 11 clamped thereon. Rotation of the piston 11 upon its axis results in relative rolling movement between the rollers 22 and 23 and the piston skirt whereby to form an arcuate knurled band on the outer periphery of the piston skirt as previously described.

During knurling, the piston 11 is stabilized by means of the chuck jaws 12 and the clamping action of the anvil roller 22 and the knurling roller 23. Since the piston 11 is retained against lateral movement and is rotated on a fixed axis by means of the lathe chuck, the arms 19 and 21 will pivot in unison about the fulcrum pin 47 to the extent permitted by the end clearances 81 and 82 in order to accommodate slight variations in the effective external diameter of the piston as a result of its normal out-of-round contour.

During the course of the knurling operation, if the anvil roller 22 encounters internal protuberances or other surface irregularities on the interior surface of the piston skirt, it will be seen that the yielding application of the anvil roller 22, by the spring loading device 54, against the inner surface of the piston skirt permits the anvil roller 22 to be forced away from the knurling roller 23 by the protuberances, the arm 19 and its associated block 51 pivoting about the fulcrum pin 47 against the action of the spring 61. The slight compression of the spring 61 resulting from such rocking movement will have no significant effect on the pressure with which the skirt portion of the piston 11 is clamped between the anvil roller 22 and the knurling roller 23. Thus, my device provides for substantially constant knurling pressure, as predetermined by the setting of the adjusting nut 63 and the lock nut 66, even when the spacing between the rollers 22 and 23 varies as the roller 22 passes over surface irregularities on the interior of the piston skirt. In addition, the clearances 81 and 82 between the end wall 24 and the inner end of the arm 21 and its attached block 46 permits the arm 21 to pivot slightly together with the arm 19 and thereby accommodate the normal out-of-round piston contour as the rollers 22 and 23 traverse the piston surfaces.

Although the invention has been described in detail with reference to a preferred structural embodiment, it will be understood that various modifications and equivalent structures may be resorted to without departing from the scope of the invention as defined in the appended claims.

I claim:

1. A device for knurling the thrust faces of the skirt portion of a piston, said device comprising a body member having oppositely disposed side walls and an end wall, said side walls and end wall defining a slot, a pair of elongated supporting arms extending into said body member through said slot and between said side walls, a fulcrum pin journalled in the side walls of said body member and having said arms pivotally supported thereon for movement away from and toward each other, an anvil roller mounted on the outer end of one of said arms and a knurling roller mounted at the outer end of the other of said arms and adapted to engage the interior and exterior surfaces respectively of the piston skirt, and spring means engaging said arms adjacent said fulcrum pin for yieldingly urging said rollers toward each other.

2. A device for knurling the thrust faces of the skirt portion of a piston, said device comprising a body member, a pair of elongated supporting arms extending from said body member, said arms being pivotally supported on said body member for movement away from and toward each other, an anvil roller mounted on the outer end of one of said arms and a knurling roller mounted at the outer end of the other of said arms and adapted to engage the interior and exterior surfaces respectively of the piston skirt, adjustable spring loading means coacting between said arms for yieldingly urging said rollers toward each other, said spring loading means being releasable to permit disengagement of said rollers from the interior and exterior surfaces of the piston skirt, and separate springs means interposed between the body member and said arms for swinging said arms away from each other and relative to the body member whereby to effect disengagement of said rollers when said spring loading means is in released position.

3. A device for knurling the thrust faces of the skirt portion of a piston, said device comprising a body member having oppositely disposed side walls defining a slot, a pair of elongated supporting arms extending into said body member through said slot and between said side walls, said arms being pivotally supported within said body member for movement away from and toward each other, an anvil roller mounted on the outer end of one of said arms and a knurling roller mounted at the outer end of the other of said arms and adapted to engage the interior and exterior surfaces respectively of the piston skirt, adjustable spring loading means coacting between said arms for yieldingly urging said rollers toward each other, said spring loading means being releasable to permit disengagement of said rollers from the interior and exterior surfaces of the piston skirt, a thrust member extending between the side walls of said body member intermediate said arms, and a pair of spring members operatively engaging said arms and bearing against said thrust member at opposite sides thereof for swinging said arms outwardly relative to said body member whereby to effect disengagement of said rollers when said spring loading means is in released position.

4. A device for knurling the thrust faces of the skirt portion of a piston, said device comprising a body member having oppositely disposed side walls and an end wall, said side walls and end wall defining a slot, an elongated anvil-supporting arm extending into said body member through said slot between said side walls, an anvil roller journaled at the outer end of said anvil-supporting arm and adapted to engage the interior surface of the piston skirt, an elongated knurl-supporting arm extending into said body member in generally parallel relation with said anvil-supporting arm, a knurling roller journaled at the outer end of said knurl-supporting arm and adapted to engage the exterior surface of the piston skirt in substantial radial alignment with said anvil roller, said arms being pivotally supported within said body member for movement away from and toward each other to engage and disengage said rollers with the piston skirt, the inner end of said knurl-supporting arm being disposed in abutment with the end wall of the body member when said knurling roller is in disengaged position and clearance being provided between the inner end of said knurl-supporting arm and said end wall when the knurling roller is pressed into knurling engagement with the exterior surface of the piston skirt to permit the knurl-supporting arm to swing to a slight extent so that the knurling roller may conform to the oval shape of the piston skirt, and spring means coacting between said arms for yieldingly urging said rollers toward each other, said spring means being releasable to permit disengagement of said knurling and anvil rollers from the piston skirt.

5. A device for knurling the thrust faces of the skirt portion of a piston, said device comprising a body member having a slot therein, a pair of elongated supporting arms mounted in said slot and extending from said body member, said arms being pivotally supported on said body member for movement away from and toward each other, an anvil roller mounted on the outer end of one of said arms and a knurling roller mounted on the outer end of the other of said arms and adapted to engage the interior and exterior surfaces respectively of the piston skirt, and a spring loading mechanism coacting with said arms for yieldingly urging said rollers toward each other, said mechanism comprising an elongated screw extending through said arms within said slot and operably connected to one of said arms, an adjustable helical spring encircling said screw, and a thrust member loosely carried on said screw for transmitting the pressure of said helical spring to and bearing against the other of said arms.

6. A device for knurling the thrust faces of the skirt portion of a piston, said device comprising a body member, a pair of elongated supporting arms extending from said body member, said arms being pivotally supported on said body member for movement away from and toward each other, an anvil roller mounted on the outer end of one of said arms and a knurling roller mounted on the outer end of the other of said arms and adapted to engage the interior and exterior surfaces respectively of the piston skirt, and a spring loading mechanism coacting with said arms for yieldingly urging said rollers toward each other, said mechanism comprising an elongated screw extending into said body member adjacent said arms and operably connected to one of said arms, an adjustable helical spring encircling said screw, a thrust member loosely carried on said screw for transmitting the pressure of said helical spring to the other of said arms, means for rotating said screw at its operating connection with said one arm, and means for disengaging said thrust member from said other arm upon rotation of said screw whereby to release the spring pressure urging said arms toward each other.

CERNYW F. JONES.

References Cited in the file of this patent

UNITED STATES PATENTS

| Number | Name | Date |
| --- | --- | --- |
| 293,826 | Way | Feb. 19, 1884 |
| 632,358 | Miller | Sept. 5, 1899 |
| 637,320 | Billings | Nov. 21, 1899 |
| 940,301 | Carlborg | Nov. 16, 1909 |
| 2,083,775 | Carroll | June 15, 1937 |